United States Patent [19]

Blythe et al.

[11] Patent Number: 5,286,429
[45] Date of Patent: Feb. 15, 1994

[54] HIGH MELT INDEX POLYSTYRENE FOAM AND METHOD

[75] Inventors: James E. Blythe, Williamson; Edward A. Colombo, Penfield; Charles M. Krutchen, Pittsford; Phillip A. Williams, Naples; Wen-Pao Wu, Pittsford, all of N.Y.

[73] Assignee: Mobil Oil Corporation, Fairfax, Va.

[21] Appl. No.: 734,836

[22] Filed: Jul. 24, 1991

Related U.S. Application Data

[63] Continuation-in-part of Ser. No. 586,313, Sep. 4, 1990, abandoned, which is a continuation of Ser. No. 211,625, Jun. 27, 1988, abandoned.

[51] Int. Cl.$^5$ .................................................. C08J 9/08
[52] U.S. Cl. .................................... 264/51; 521/79; 521/97; 521/146
[58] Field of Search .................. 264/51; 521/79, 97, 521/146

[56] References Cited

U.S. PATENT DOCUMENTS

| | | | |
|---|---|---|---|
| 3,431,164 | 3/1969 | Gilbert | 264/50 |
| 4,198,363 | 4/1980 | Noel | 264/45.9 |
| 4,344,710 | 8/1982 | Johnson | 264/53 |
| 4,470,938 | 9/1984 | Johnson | 264/50 |

*Primary Examiner*—Morton Foelak
*Attorney, Agent, or Firm*—A. J. McKillop; C. J. Speciale; J. P. O'Sullivan, Sr.

[57] ABSTRACT

A polystyrene resin in foam form having a basis weight of less than about 20 g/100 in$^2$ and a density of about 6 lbs./ft$^3$ or less, the foam precursor of which is either a polystyrene having a melt index of about 8 or more or a polystyrene in combination with a minor proportion of any other material which will result in a melt index of about 8 or more. A method of forming such a polystyrene resin foam structure includes combining the resin in molten form under pressure with the blowing agent of at least approximately 100% carbon dioxide and extruding the mixture through a die into an atmosphere of reduced pressure to form the foam structure.

6 Claims, 2 Drawing Sheets

HIGH MELT INDEX POLYSTYRENE FOAM AND METHOD

This application is a continuation-in-part application of copending application Ser. No. 07/586,313 filed Sep. 4, 1990, now abandoned, which is a continuation of abandoned application Ser. No. 211,625, filed Jun. 27, 1988, now abandoned.

FIELD OF THE INVENTION

The present invention relates to a low-density high melt index polystyrene foam structure and a method for forming the same.

Extruded polystyrene foam is an important commercial material utilized for packaging articles, such as food products, and in thicker forms it is utilized as an insulating material. Moreover, polystyrene foam is excellent as a shock absorbing material for shipping purposes in the form of small subdivided chunks or thermoformed structures.

BACKGROUND OF THE INVENTION

Polystyrene foam is most commonly made by combining a physical blowing agent with molten polystyrene resin under pressure and, after thorough mixing, extruding the combination through an appropriate die into a lower pressure atmosphere. From about the 1950's to the present, the physical blowing agents of choice have been the halocarbons, hydrocarbons or mixtures of the same. Examples of these include commercially available Freon compositions, such as dichlorodifluoromethane, trichlorofluoromethane and the $C_4$-$C_6$ hydrocarbons, with isopentane being preferred. These blowing agents, while being effective in producing the proper foam structure and excellent surface characteristics, do have their own drawbacks and disadvantages. These blowing agents are released to the atmosphere during and after foam production and are a cause of pollution. The hydrocarbon blowing agents in addition constitute a fire hazard.

Through the years, carbon dioxide has been experimented with as a blowing agent for polystyrene resin. It is listed as a blowing agent in Gilbert et al, U.S. Pat. No. 3,431,164, Noel, U.S. Pat. No. 4,198,363, Johnson, U.S. Pat. No. 4,470,938, and others. No prior investigator has actually demonstrated that 100% $CO_2$, can produce a commercially acceptable foamed polystyrene product. To date, the best utility for carbon dioxide in foamed polystyrene is as a co-blowing agent or a diluent for hydrocarbon or halocarbon blowing agents, see, for example, Johnson et al U.S. Pat. No. 4,344,710 and the article by L. M. Zwolinski and F. J. Dwyer, Extruded Polystyrene Foam with CFC/Carbon Dioxide Blowing Agents, ANTEC'86 pages 30-33, Conference Proceedings, Society of Plastic Engineers 44th Annual Technical Conference and Exhibit.

It is an object of the present invention to provide a polystyrene resin in foam form employing as a precursor resin a polystyrene not heretofore successfully converted to an excellent foam structure.

It is another object of the present invention to present a process for foaming a particular class of polystyrene resins employing 100% carbon dioxide as the blowing agent.

SUMMARY OF THE INVENTION

The present invention is concerned with a polystyrene resin in foam form having a basis weight of less than about 20 g/100 in$^2$ and a density of about 6 lbs/ft$^3$ or less, the foam precursor of which is a member selected from the group consisting of (1) a polystyrene having a melt index of from about 8 or more and (2) a polystyrene in combination with a minor proportion of any other material which will result in said melt index. The melt index of said resin is preferably from about 8 to about 25.

The invention is also concerned with a method of forming a polystyrene resin foam structure comprising combining a polystyrene resin having a melt index of about 8 or more in molten form under pressure with a blowing agent of at least approximately 100% carbon dioxide and extruding the mixture through a die into an atmosphere of reduced pressure to form a foam structure having a basis weight of less than about 20 g/100in$^2$ and a density of about 6 lbs/ft$^3$ or less.

DETAILED DESCRIPTION OF THE INVENTION

Figure 1:
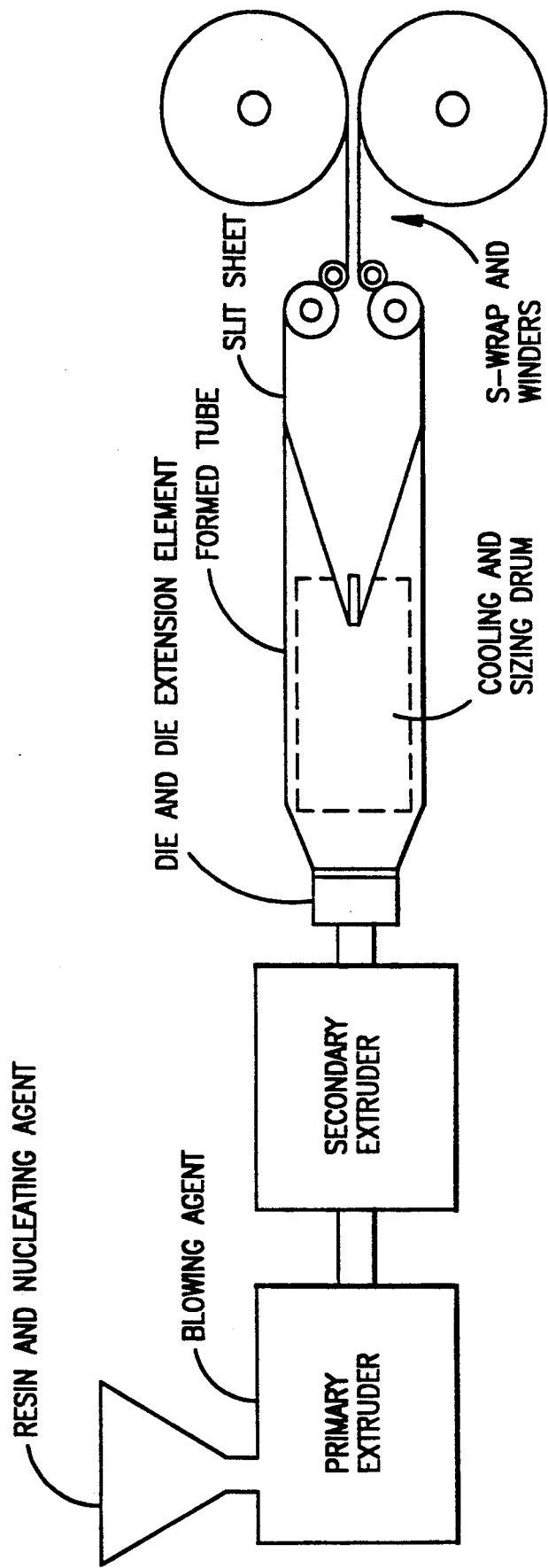
FIG. 1 is a schematic flow diagram of an overall sequence of operations involved in the manufacture of the subject foamed polystyrene sheet.

As employed herein the language "high-melt index polystyrene" is intended to refer to a polystyrene having a melt index of about 8 or more or a polystyrene in combination with a minor proportion of any other material which will result in a mixture having a melt index of 8 or more. An example of the latter would be a polystyrene resin having a melt index of, for example, 4 but which in combination with mineral oil will demonstrate a melt index of greater than 8. Examples of other such additives are metal salts of stearic acid, e.g. zinc stearate, fatty acid, fatty alcohols, fatty acid esters and paraffin waxes.

As employed herein the term "melt index" refers to the flow rate of the polystyrene resin contemplated by Extrusion Plastometer. The standard test method for this is designated as ASTM D 1238-79. In essence, the melt index value refers to the flow rate of the molten resin in grams during a 10 minute period of time. No blowing agent should be present in the resin or resin combination in performing this test.

It is believed that no blowing agent other than carbon dioxide can yield the same overall foam quality in high melt index polystyrene resins without polluting the atmosphere. Using 100% carbon dioxide in low melt index polystyrene resins yield foams with severe deficiencies in appearance and properties. When employing high melt index polystyrene and 100% $CO_2$ the resulting foam has essentially the same physical characteristics as that formed from low melt index polystyrene employing conventional blowing agents, such as, the Freons or hydrocarbons. In the Encyclopedia of Polymer Science and Engineering (2nd ed., John Wiley, Sons) 1989 Volume 16, pg. 62-71 under *General Purpose Polystyrene* the authors classify polystyrene into 3 typical commercial grades. These grades are identified as high heat, i.e., melt index 1.6, medium flow, melt index 7.5 and easy flow, melt index 16 see page 64, Table 2. The authors indicate that the easy flow and medium flow polystyrenes are used primarily for injection molding. The high heat polystyrene, i.e., low melt index resin is used for extrusion applications. Thus, the present invention is concerned with employing a polystyrene resin grade which has not been heretofore employed for commercial extrusion applications.

In forming the foam sheet of the present invention foam of good utility can be formed using conventional extrusion techniques. It has been found, however, that the best quality foam material can be formed when utilizing what is generally known as a die extension system. Systems of this type are described in Gilbert, U.S. Pat. No. 3,431,164, Noel, U.S. Pat. No. 4,198,363, the disclosures of which are incorporated herein, in their entirety. The best system, however, for forming the foam structure of the present invention is that described in co-pending application Ser. No. 07/586,313 filed Sep. 4, 1990 as a continuation of abandoned application Ser. No. 211,625 filed Jun. 27, 1988. The disclosure of this application is also incorporated herein in its entirety.

The contemplated resins for the present invention will have a melt index of about 8 or more and can be styrene homopolymers or copolymers containing a predominant portion of styrene, i.e., greater than about 50 wt % styrene, with those containing greater than about 25 wt % styrene being especially preferred. In the case of a styrene copolymer, the comonomer can be any other ethylenically unsaturated material such as the conjugated 1,3-dienes, e.g., butadiene, isoprene, etc.

In general, the useful styrene polymers have a weight average molecular weight ($M_w$) in the range of from about 100,000–400,000 and preferably from about 150,000–350,000. Homopolymers derived from styrene and p-methylstyrene are preferred. Polystyrene homopolymers possessing a $M_{w'}$ of from about 175,000–250,000 represent an especially preferred type of thermoplastic resin for practicing the extrusion process herein due to their ability to provide a foam sheet stock having exceptionally good balance of flexural stiffness in both the machine and transverse directions.

In carrying out the process of the present invention the blowing agent will be at least approximately 100% carbon dioxide. 100% carbon dioxide is preferred, however, it is to be understood that the presence of some other blowing agent present in up to a few percent can be tolerated as an ecological contaminant. Blends of gross amounts of prior art blowing agents with carbon dioxide, are beyond the scope of the present invention. It is believed that since no other blowing agent can foam high melt index polystyrene to yield the same overall quality product as that formed with carbon dioxide the combination of a prior art blowing agent with $CO_2$ will progressively deteriorate the quality of the product as the amount of the prior art agent is increased in the combination. Thus, ecological problems aside, while some low percentage of a prior art blowing agent could be tolerated, it is believed that when this amount exceeds about 10% of the blowing agent mixture, the quality is significantly inferior. No benefit is seen in employing such a mixture. The 10% portion is merely an indication of tolerable limits of an undesirable material.

Although a nucleating agent or combination of such agents is not a critical requirement of this invention, the well-known advantages of employing nucleating agents, i.e., the capacity for regulating cell formation and morphology, make their use desirable in most cases. Any of the known and conventional nucleating agents and their mixtures can be used. Included are talc, mixtures of sodium bicarbonate and citric acid, and the like, in the customary amounts. If desired, fillers, colorants, light and heat stabilizers, lubricants, etc. can be included in the foamable resin compositions in the usual amounts.

A typical two-extruder tandem system can be used for extrusion of foam sheet using the process of the present invention.

For example, the high melt index polystyrene resin pellets are mixed with a nucleating agent such as talc. These materials are continuously fed into a hopper of a 2½ in. diameter screw primarily extruder. The fed mixture is urged forward by the helical screw within the barrel of the extruder as the mixture is mixed, compressed, heated, and converted to molten form prior to reaching the injection zone for addition of the blowing agent. The $CO_2$ blowing agent is injected into the polystyrene composition at a point beyond the feed zone where the polystyrene is in a molten condition.

Following injection of the blowing agent, the mixture is continuously mixed in the primary extruder and subsequently passed at a pressure high enough to aid solubility of the blowing agent through a hollow adaptor section into a cooled 3½ in. secondary tandem extruder. The molten mixture is passed along the length of the cooled secondary extruder at low shear, cooling and additional mixing take place and the mixture is expressed through the die of the unit.

As indicated above best results are obtained employing a die extension unit. This can be of prior art construction as indicated above, but more preferably can be of the construction described in the aforementioned copending application Ser. No. 07/586,313.

The pressurized mixture of molten polymer nucleating agent and carbon dioxide dissolved therein is, as indicated, extruded through the temperature controlled die-lip/die extension unit assembly to provide a foamed tube which is thereafter cooled and stretched (usually 3–5 times the die lip dimension) and cooled over a cooling and sizing drum, slit into upper and lower sheets by means of slitters associated with the drum, the sheets then being passed through s-wrap rollers and taken up on winding drums.

With reference to FIG. 1 a two-extruder tandem system can be used for extrusion of the foam sheet of the present invention. Polystyrene resin pellets are mixed with a nucleating agent and fed continuously into the hopper of a 2½ diameter screw primary extruder. The feed mixture is urged forward by the helical screw within the barrel of the extruder as the mixture is mixed, compressed, heated and converted to molten form prior to reaching the injection zone for addition of the blowing agent. The carbon dioxide blowing agent is injected into the polystyrene composition at a point beyond the feed zone where the polystyrene is in a molten condition. Following injection of the blowing agent, the mixture is continuously mixed in the primer extruder and subsequently passed, at pressure high enough to aid solubility of the blowing agent, through a hollow adaptor section into a cooled 3½ in. secondary tandum extruder. The molten mixture is passed along the length of the cooled secondary extruder at low sheer, cooling and additional mixing take place, and the mixture is expressed through the die lip/die extension unit. It is desirable that the melt temperature of the polymer entering the die be reduced to a relative low value for best results. This lower melt temperature of the polymer entering the die produces foam sheet properties of improved MD/TD ratio.

Figure 2:
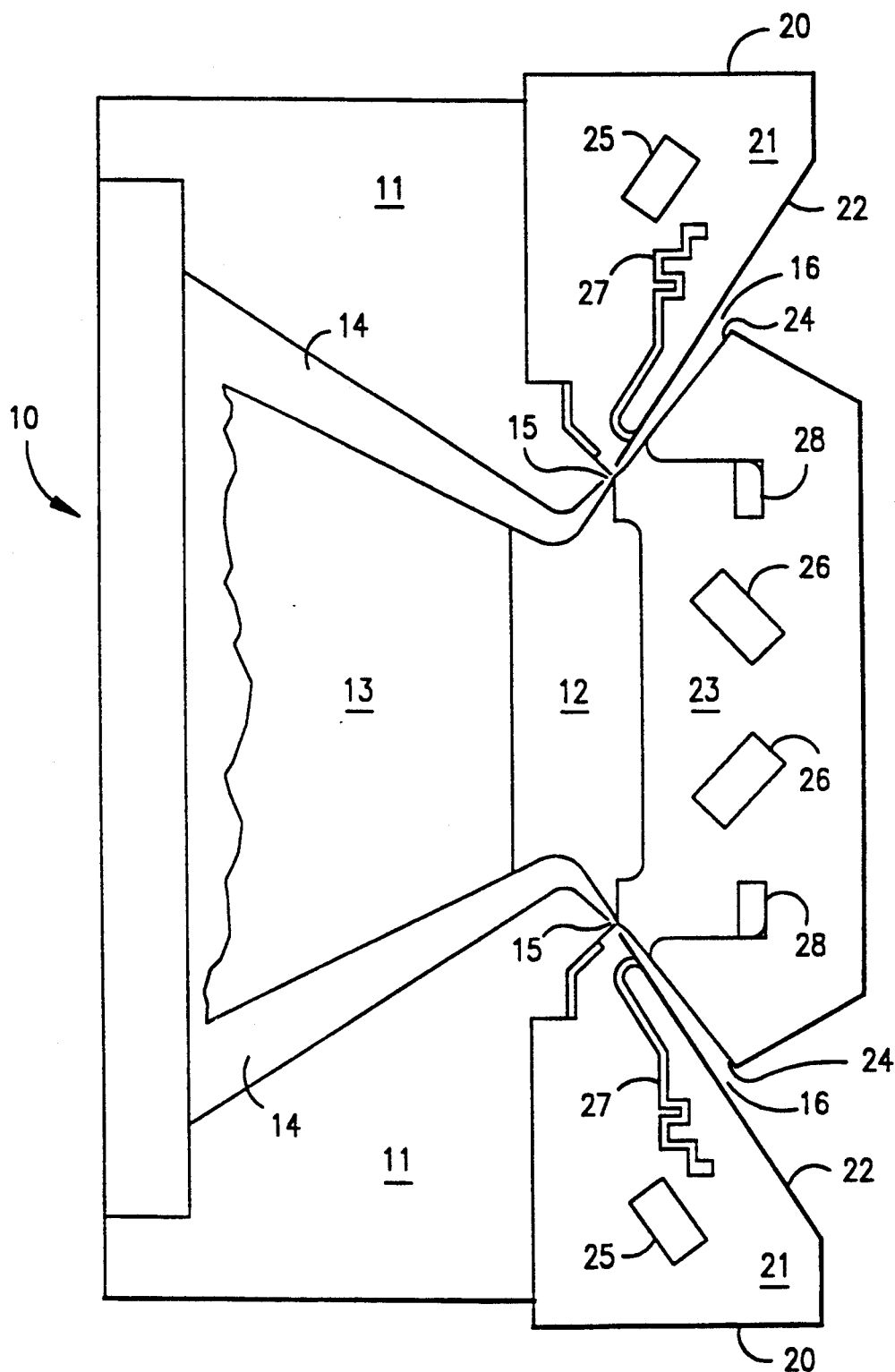
FIG. 2 is a cross-sectional, side elevation view of a portion of the extrusion die lip and die extension unit assembly of the extrusion apparatus of this invention.

As shown in FIG. 2, die lip 10 includes an outside die lip 11, an inside die lip 12 and mandrel 13, all of which cooperate to define an angular melt flow channel 14 terminating in a die gap 15 through which molten foamable polymer is extruded to a region of confined foaming 16 where gradual and controlled expansion of the extrudate takes place. Die extension unit 12 includes an outer extension element 21 possessioning an outer sheet forming surface 22 an inner extension element 23 possessioning an inner sheet forming surface 24. Either or both sheet forming surfaces can be planar and/or curved and may possess more than one angle providing the cross sectional area increases as it progresses in the extruding direction. The surfaces can possess the same or different lengths. For a particular set of extrusion conditions including a die gap of a given magnitude, (1) the angle(s) of outer sheet forming surface 22 relative to the machine direction (i.e., the direction which is coincident with the longitudinal access of extrusion), (2) the angle(s) of inner sheet forming surface 24 relative to outer sheet forming surface 22 and (3) the lengths of surfaces 22 and 24, i.e., the geometric parameters which fully define confined foaming region 16 and its position relative to the machine direction, can be set in such a way as to provide, in combination with process conditions, a defect-free surface of foam sheet having optimum smoothness.

Both inner and outer die extension elements 21 and 23 are provided with passages 25 and 26 through which a coolant, e.g., oil, flows to provide temperature control. By reducing the temperature of sheet forming surfaces 22 and 24, it is possible to solidify the expanding foam in contact with the surface and effect release of this foam from the chamber surfaces 22 and 24. Temperature control of the extender in the confined foaming region is important to obtain defect-free sheet. In addition, elements 21 and 23 possess channels 27 and 28 through which a lubricant, e.g., water, can be directed against the expanding foam as it passes through confined foaming region 16. Provision of lubricant against one, and preferably both surfaces of the expanding foam sheet enhances this release and reduces the friction of the foam sliding through the controlled expansion region.

Temperature in the extrusion area is maintained in a range sufficient to produce surface free of defects by providing a cooling medium through passages 25 and 26. Control of temperature in the die extension element also functions to eliminate sticking. The optimum temperature to be used is related to the melt temperature of the resin mixture. The temperature control of extrusion makes possible better control of foaming. In the past, the use of carbon dioxide as a foaming agent produced heavy corrugation in the foam sheet. Furthermore in the past, the use of low molecular weight polystyrene produced inferior sheet probably because the hydrocarbon blowing agents needed to be used caused the polystyrene to foam in an uncontrolled manner. These problems are eliminated with the present invention.

EXAMPLE

This example illustrates the production of a polystyrene sheet foamed with 100% liquid carbon dioxide. The polystyrene had a Mw of about 190,000, a polydispersability of 2.5, which upon the addition of 3% mineral oil has a Melt Index of 15. Without the mineral oil it has a Melt Index of about 8. This polystyrene is ordinarily regarded as unsuitable for conventional hydrocarbon and/or CFC extrusion foaming operations. The extruder is a known type including, a tandem system having a 2½ inch diameter primary extruder, a 3½ inch diameter secondary extruder and a 2½ inch diameter die with an output of about 147 lbs./hour. The melt temperature in the primary extruder was 472° F. and in the secondary extruder was 285° F. The extruder was equipped with a die extension unit as described in copending application Ser. No. 07/586,313. This unit was comprised of diverging walls. The wall contacting the outer surface of the extruded sheet was at an angle of 75° relative to the machine direction and was 2.5 inches long. The angle of the inner sheet forming surface relative to the outer sheet forming surface was 4.5° and was 1.25 inches long. Cooling in the die extension unit was to a temperature of 210° F.

The extruded sheet had a density of about 3.6 lbs./cubic foot and had smooth surfaces. The sheet was made into meat packaging trays with properties in the following ranges:

| Tray weight (gms) | 9.1-9.8 |
| --- | --- |
| Side crush (lbs) | 2.9-3.8 |
| End crush (lbs) | 3.3-3.7 |
| MD/TD Flexural Modulus Ratio | 1.3-1.7 |

These are excellent physical characteristics for polystyrene foam meat trays.

What is claimed is:

1. In a method for forming foamed polystyrene the improvement consisting of employing polystyrene resin or a polystyrene resin composition having a melt index of about 8 or more as the foam precursor and defining the foam cell structure by employing at least approximately 100% carbon dioxide to yield a foam structure having a basis weight of less than 20 gms/100 in$^2$ and a density of about 6 lbs/ft$^3$ or less.

2. The method of claim 1 wherein said polystyrene resin composition is polystyrene in combination with a minor proportion of any other material which will result in said melt index.

3. The method of claim 1 wherein said resin has a melt index of from about 8 to about 25.

4. The method of claim 3 wherein said mixture is extruded as a sheet into a region of lower temperature, and pressure and structure which region will physically inhibit foam expansion of said sheet during temperature drop of the extrudate.

5. The method of claim 4 wherein said region includes a pair of opposed, diverging surfaces extending from said die.

6. The method of claim 5 wherein said diverging surfaces are at least long enough to permit the foam structure to set while foam expansion is being inhibited.

* * * * *